United States Patent
Gong et al.

(10) Patent No.: US 9,093,102 B1
(45) Date of Patent: Jul. 28, 2015

(54) SYSTEMS AND METHODS FOR TUNING SEED LAYER HARDNESS IN COMPONENTS OF MAGNETIC RECORDING SYSTEMS

(71) Applicant: Western Digital Technologies, Inc., Irvine, CA (US)

(72) Inventors: Yongping Gong, Pakkret (TH); Phuwanai Bunnak, Lumlookka (TH); Kah Choong Loo, Pakkret (TH); Krisda Siangchaew, Muang (TH)

(73) Assignee: Western Digital Technologies, Inc., Irvine, CA (US)

( * ) Notice: Subject to any disclaimer, the term of this patent is extended or adjusted under 35 U.S.C. 154(b) by 220 days.

(21) Appl. No.: 13/797,069

(22) Filed: Mar. 12, 2013

(51) Int. Cl.
*G11B 5/127* (2006.01)
*H04R 31/00* (2006.01)
*G11B 5/84* (2006.01)
*G11B 5/851* (2006.01)

(52) U.S. Cl.
CPC *G11B 5/84* (2013.01); *G11B 5/851* (2013.01); *Y10T 29/49705* (2015.01)

(58) Field of Classification Search
CPC C23C 14/505; C23C 14/568; C23C 14/0605; C23C 14/06; C23C 14/22; G11B 5/84; G11B 5/851; G11B 9/1409; G11B 5/8408; Y10T 29/49705
USPC .............. 29/603.07, 603.01, 603.03, 603.12; 427/128, 131, 251, 255.5
See application file for complete search history.

(56) References Cited

U.S. PATENT DOCUMENTS

| | | | |
|---|---|---|---|
| 6,075,673 A | 6/2000 | Wilde et al. | |
| 6,097,575 A | 8/2000 | Trang et al. | |
| 6,125,014 A | 9/2000 | Riedlin, Jr. | |
| 6,125,015 A | 9/2000 | Carlson et al. | |
| 6,130,863 A | 10/2000 | Wang et al. | |
| 6,137,656 A | 10/2000 | Levi et al. | |
| 6,139,695 A * | 10/2000 | Washburn et al. | 204/192.12 |
| 6,144,528 A | 11/2000 | Anaya-Dufresne et al. | |
| 6,147,838 A | 11/2000 | Chang et al. | |
| 6,151,196 A | 11/2000 | Carlson et al. | |
| 6,178,064 B1 | 1/2001 | Chang et al. | |
| 6,181,522 B1 | 1/2001 | Carlson | |
| 6,181,673 B1 | 1/2001 | Wilde et al. | |
| 6,229,672 B1 | 5/2001 | Lee et al. | |
| 6,236,543 B1 | 5/2001 | Han et al. | |
| 6,246,547 B1 | 6/2001 | Bozorgi et al. | |
| 6,249,404 B1 | 6/2001 | Doundakov et al. | |
| 6,330,131 B1 | 12/2001 | Nepela et al. | |
| 6,339,518 B1 | 1/2002 | Chang et al. | |
| 6,349,017 B1 | 2/2002 | Schott | |
| 6,373,660 B1 | 4/2002 | Lam et al. | |
| 6,378,195 B1 | 4/2002 | Carlson | |
| 6,433,965 B1 | 8/2002 | Gopinathan et al. | |
| 6,522,504 B1 | 2/2003 | Casey | |

(Continued)

*Primary Examiner* — Thiem Phan

(57) ABSTRACT

Systems and methods for tuning seed layer hardness in components of magnetic recording systems are described. One such system includes a substrate including a component of a magnetic recording system, a first deposition source configured to deposit a seed layer material on a portion of a top surface of the substrate at a first angle, and a second deposition source configured to deposit a carbon material including sp3 carbon bonds on the portion of the top surface at a second angle not equal to the first angle, where the first deposition source and the second deposition source deposit the seed layer material and the carbon material, respectively, simultaneously. The component can be a slider or a magnetic medium.

23 Claims, 5 Drawing Sheets

(56) References Cited

U.S. PATENT DOCUMENTS

| | | |
|---|---|---|
| 6,538,850 B1 | 3/2003 | Hadian et al. |
| 6,569,295 B2 | 5/2003 | Hwang et al. |
| 6,583,953 B1 | 6/2003 | Han et al. |
| 6,646,832 B2 | 11/2003 | Anaya-Dufresne et al. |
| 6,661,612 B1 | 12/2003 | Peng |
| 6,665,146 B2 | 12/2003 | Hawwa et al. |
| 6,690,545 B1 | 2/2004 | Chang et al. |
| 6,704,173 B1 | 3/2004 | Lam et al. |
| 6,708,389 B1 | 3/2004 | Carlson et al. |
| 6,717,773 B2 | 4/2004 | Hawwa et al. |
| 6,721,142 B1 | 4/2004 | Meyer et al. |
| 6,744,599 B1 | 6/2004 | Peng et al. |
| 6,771,468 B1 | 8/2004 | Levi et al. |
| 6,796,018 B1 | 9/2004 | Thornton |
| 6,801,402 B1 | 10/2004 | Subrahmanyam et al. |
| 6,856,489 B2 | 2/2005 | Hawwa et al. |
| 6,873,496 B1 | 3/2005 | Sun et al. |
| 6,912,103 B1 | 6/2005 | Peng et al. |
| 6,937,439 B1 | 8/2005 | Chang et al. |
| 6,956,718 B1 | 10/2005 | Kulkarni et al. |
| 6,972,930 B1 | 12/2005 | Tang et al. |
| 7,006,330 B1 | 2/2006 | Subrahmanyam et al. |
| 7,006,331 B1 | 2/2006 | Subrahmanyam et al. |
| 7,010,847 B1 | 3/2006 | Hadian et al. |
| 7,019,945 B1 | 3/2006 | Peng et al. |
| 7,027,264 B1 | 4/2006 | Subrahmanyam et al. |
| 7,085,104 B1 | 8/2006 | Hadian et al. |
| 7,099,117 B1 | 8/2006 | Subrahmanyam et al. |
| 7,154,696 B2 | 12/2006 | Nikitin et al. |
| 7,174,622 B2 | 2/2007 | Meyer et al. |
| 7,289,299 B1 | 10/2007 | Sun et al. |
| 7,307,816 B1 | 12/2007 | Thornton et al. |
| 7,315,435 B1 | 1/2008 | Pan |
| 7,315,436 B1 | 1/2008 | Sanchez |
| 7,414,814 B1 | 8/2008 | Pan |
| 7,436,631 B1 | 10/2008 | Fanslau, Jr. et al. |
| 7,474,508 B1 | 1/2009 | Li et al. |
| 7,477,486 B1 | 1/2009 | Sun et al. |
| 7,495,865 B2 | 2/2009 | Chen et al. |
| 7,593,190 B1 | 9/2009 | Thornton et al. |
| 7,595,963 B1 | 9/2009 | Chen et al. |
| 7,616,405 B2 | 11/2009 | Hu et al. |
| 7,618,720 B2 | 11/2009 | Derflinger |
| 7,729,089 B1 | 6/2010 | Hogan |
| 7,808,750 B2 | 10/2010 | Yanagisawa et al. |
| 7,995,310 B1 | 8/2011 | Pan |
| 8,081,400 B1 | 12/2011 | Hu |
| 8,087,973 B1 | 1/2012 | Sladek et al. |
| 8,089,730 B1 | 1/2012 | Pan et al. |
| 8,164,858 B1 | 4/2012 | Moravec et al. |
| 8,199,437 B1 | 6/2012 | Sun et al. |
| 8,208,224 B1 | 6/2012 | Teo et al. |
| 8,218,268 B1 | 7/2012 | Pan |
| 8,240,545 B1 | 8/2012 | Wang et al. |
| 8,256,272 B1 | 9/2012 | Roajanasiri et al. |
| 8,277,962 B2 | 10/2012 | Zhou et al. |
| 8,284,527 B2 | 10/2012 | Yoshida et al. |
| 8,295,012 B1 | 10/2012 | Tian et al. |
| 8,295,013 B1 | 10/2012 | Pan et al. |
| 8,295,014 B1 | 10/2012 | Teo et al. |
| 8,320,084 B1 | 11/2012 | Shum et al. |
| 8,325,446 B1 | 12/2012 | Liu et al. |
| 8,325,447 B1 | 12/2012 | Pan |
| 8,339,742 B1 | 12/2012 | Sladek et al. |
| 8,339,747 B1 | 12/2012 | Hales et al. |
| 8,339,748 B2 | 12/2012 | Shum et al. |
| 8,343,363 B1 | 1/2013 | Pakpum et al. |
| 8,345,519 B1 | 1/2013 | Pan |
| 8,418,353 B1 | 4/2013 | Moravec et al. |
| 8,441,896 B2 | 5/2013 | Wang et al. |
| 8,446,694 B1 | 5/2013 | Tian et al. |
| 8,456,643 B2 | 6/2013 | Prabhakaran et al. |
| 8,456,776 B1 | 6/2013 | Pan |
| 8,462,462 B1 | 6/2013 | Moravec et al. |
| 8,477,459 B1 | 7/2013 | Pan |
| 8,485,579 B2 | 7/2013 | Roajanasiri et al. |
| 8,488,279 B1 | 7/2013 | Pan et al. |
| 8,488,281 B1 | 7/2013 | Pan |
| 8,490,211 B1 | 7/2013 | Leary |
| 8,514,522 B1 | 8/2013 | Pan et al. |
| 8,533,936 B1 | 9/2013 | Puttichaem et al. |
| 8,545,164 B2 | 10/2013 | Choumwong et al. |
| 8,553,365 B1 | 10/2013 | Shapiro et al. |
| 8,587,901 B1 | 11/2013 | Puttichaem et al. |
| 8,593,764 B1 | 11/2013 | Tian et al. |
| 8,599,653 B1 | 12/2013 | Mallary et al. |
| 8,605,389 B1 | 12/2013 | Pan et al. |
| 8,611,050 B1 | 12/2013 | Moravec et al. |
| 8,611,052 B1 | 12/2013 | Pan et al. |
| 8,623,197 B1 | 1/2014 | Kobsiriphat et al. |
| 8,624,184 B1 | 1/2014 | Souza et al. |
| 8,638,529 B1 | 1/2014 | Leng et al. |
| 8,665,566 B1 | 3/2014 | Pan et al. |
| 8,665,567 B2 | 3/2014 | Shum et al. |
| 8,665,677 B1 | 3/2014 | Panitchakan et al. |
| 8,665,690 B1 | 3/2014 | Moravec et al. |
| 8,693,144 B1 | 4/2014 | Pan et al. |
| 8,756,795 B1 | 6/2014 | Moravec et al. |
| 8,758,083 B1 | 6/2014 | Rudy et al. |
| 8,760,812 B1 | 6/2014 | Chen et al. |
| 8,770,463 B1 | 7/2014 | Puttichaem et al. |
| 8,773,664 B1 | 7/2014 | Wang et al. |
| 8,792,212 B1 | 7/2014 | Pan et al. |
| 8,792,213 B1 | 7/2014 | Vijay et al. |
| 8,797,691 B1 | 8/2014 | Tian et al. |
| 2005/0142385 A1* | 6/2005 | Jin .................... 428/694 T |
| 2013/0244541 A1 | 9/2013 | Yaemglin et al. |
| 2013/0293982 A1 | 11/2013 | Huber |

\* cited by examiner

SYSTEMS AND METHODS FOR TUNING SEED LAYER HARDNESS IN COMPONENTS OF MAGNETIC RECORDING SYSTEMS

FIELD

The present invention relates generally to magnetic recording systems, and more specifically to systems and methods for tuning seed layer hardness in components of magnetic recording systems.

BACKGROUND

One application of magnetic recording is hard disk drives. It is well known in the hard disk drive industry that a head over-coat (HOC) film is deposited on the ABS of a read-write head (e.g., such as the read-write head of a slider) to provide corrosion and wear resistance to the device. The traditional HOC film has a bi-layer structure, where a seed layer is deposited onto the device substrate first, followed by carbon film deposition. The seed layer deposition may be achieved by ion beam or magnetron sputtering deposition technologies. In both cases, seed layer material is sputtered off of a target by energetic Ar ions onto the substrate where the sliders are populated. The carbon film deposition employs filtered cathodic arc (FCA) technology.

Over the years, the seed layer material has evolved from pure Si to various mixtures of materials including Si. This is motivated by improved corrosion and wear resistance that derives from a harder and denser seed layer, which enables a reduction in the overall thickness of the HOC film. A thinner HOC film translates to narrower head to media spacing (HMS), and enhances electro-magnetic performance of the read-write head. However, the space for performance improvement from the traditional seed layer is limited by strength of selected seed layer bonds and their packing densities.

SUMMARY

Aspects of the invention relate to systems and methods for tuning seed layer hardness in components of magnetic recording systems. In one embodiment, the invention relates to a method for tuning a seed layer hardness in components of a magnetic recording system, the method including providing a substrate including a component of a magnetic recording system, depositing a seed layer material on a portion of a top surface of the substrate at a first angle, and depositing a carbon material including sp3 carbon bonds on the portion of the top surface at a second angle not equal to the first angle, where the depositing the seed layer material and the depositing the carbon material on the top surface of the substrate are performed simultaneously.

In another embodiment, the invention relates to a system for tuning a seed layer hardness in components of a magnetic recording system, the system including a substrate including a component of a magnetic recording system, a first deposition source configured to deposit a seed layer material on a portion of a top surface of the substrate at a first angle, and a second deposition source configured to deposit a carbon material including sp3 carbon bonds on the portion of the top surface at a second angle not equal to the first angle, where the first deposition source and the second deposition source deposit the seed layer material and the carbon material, respectively, simultaneously.

In yet another embodiment, the invention relates to a slider for a magnetic recording system, the slider including an air bearing surface (ABS) including a seed layer deposited using a co-deposition process including deposition of a seed layer material on the ABS at a first angle and deposition of a carbon material including sp3 carbon bonds on the ABS at a second angle not equal to the first angle, where the deposition of the seed layer material and the deposition of the carbon material are performed simultaneously, and where the seed layer includes a preselected number of the sp3 carbon bonds.

DETAILED DESCRIPTION

Figure 1:
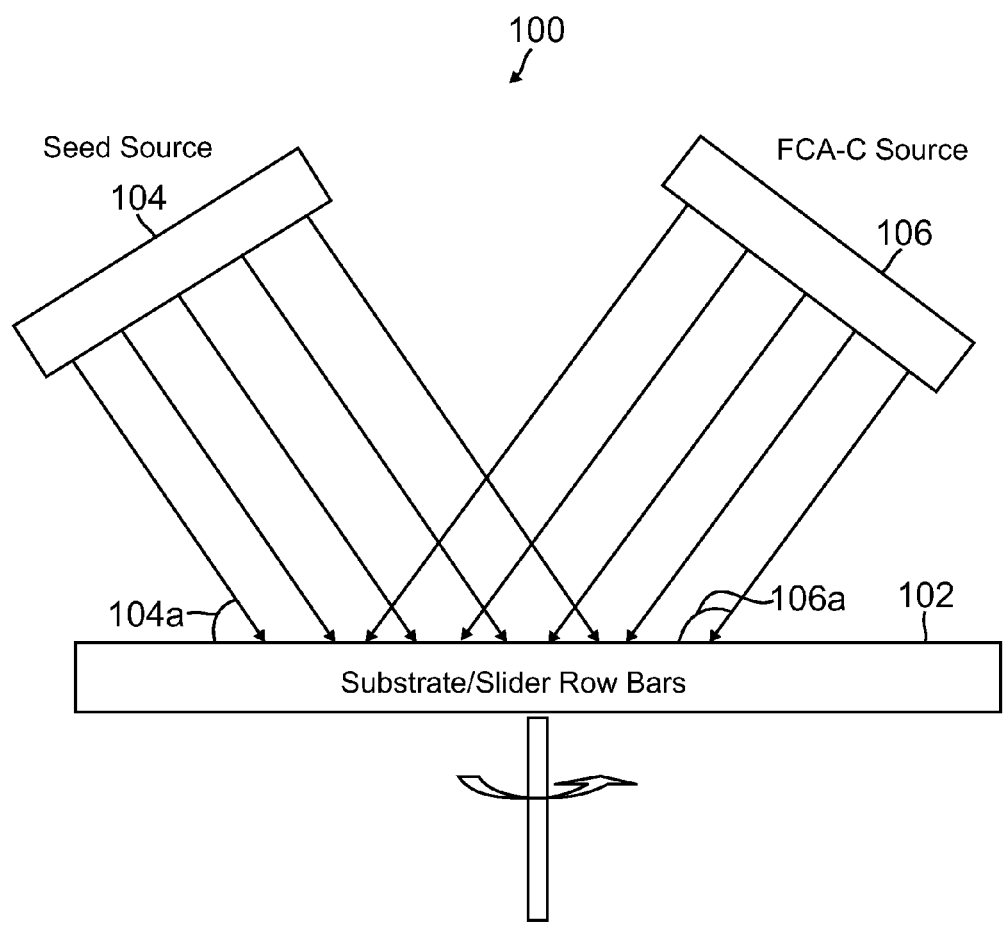
FIG. 1 is a schematic top view of a two source vacuum deposition system for tuning the seed layer hardness of sliders arranged in row bars on a rotatable substrate/pallet in accordance with one embodiment of the invention.

Referring now to the drawings, embodiments of systems and methods for tuning seed layer hardness in components of magnetic recording systems such as a slider or a magnetic medium are illustrated. The systems and methods employ a novel system or process, termed a co-deposition system/process, developed to re-engineer the seed layer of the HOC film to further improve its wear and corrosion durability. The co-deposition systems and processes effectively inject sp3 C bonds into the seed layer using a seed material source and a filtered cathodic arc (FCA) carbon (C) source. The seed material source and the FCA-C source are applied substantially at the same time in a deposition system such as a vacuum deposition system.

The sp3 C bond is the bond that forms diamond, which is the hardest among all materials known. Data collected shows that the new systems and processes can be employed to tune the hardness of the co-deposited seed layer effectively within a wide range that virtually doubles that of a seed layer deposited in the conventional way. The harder seed layer will help in enhancing wear and corrosion performance, therefore providing a potential to further reduce head over coat thickness for improved electro-magnetic gain of the read-write head, among other benefits.

The terms "above," "below," and "between" as used herein refer to a relative position of one layer with respect to other layers. As such, one layer deposited or disposed above or below another layer may be directly in contact with the other layer or may have one or more intervening layers. Moreover, one layer deposited or disposed between layers may be directly in contact with the layers or may have one or more intervening layers.

It shall be appreciated by those skilled in the art in view of the present disclosure that although various exemplary fabrication methods are discussed herein with reference to magnetic recording disks, the methods, with or without some modifications, may be used for fabricating other types of recording disks, for example, optical recording disks such as a compact disc (CD) and a digital-versatile-disk (DVD), or magneto-optical recording disks, or ferroelectric data storage devices.

FIG. 1 is a schematic top view of a two source vacuum deposition system 100 for tuning the seed layer hardness of sliders arranged in row bars on a rotatable substrate/pallet 102 in accordance with one embodiment of the invention. The two source vacuum deposition system 100 includes a seed material source 104 configured to deposit one or more seed materials on the substrate/pallet 102 at a first angle 104a measured with respect to a top surface of the substrate/pallet 102. In several embodiments, the top surface of the substrate/pallet 102 reflects a top surface of the row bars mounted within the substrate/pallet 102. The two source vacuum deposition system 100 also includes a carbon material source ("FCA-C") 106 configured to deposit or inject sp3 carbon bonds on the substrate/pallet 102 at a second angle 106a measured with respect to a top surface of the substrate/pallet 102.

In operation, the substrate/pallet 102 is configured to be rotated by a drive motor (not shown) to achieve optimal deposition uniformity. The seed material source 104 and the carbon material source 106 are configured to be applied simultaneously or about simultaneously and for about the same duration. In related art processes for forming a seed layer, a seed source is turned on first and turned off when a desired thickness for the seed layer has been achieved. Then, after the seed source has been turned off, the FCA-C source is turned on. As such, the seed source and FCA-C source are not applied simultaneously in the related art processes. In contrast, for the two source vacuum deposition system 100 of FIG. 1, the seed source 104 and the FCA-C source 106 are applied substantially simultaneously. At the same time, the deposition rates of the materials deposited by the seed source 104 and the FCA-C source 106 can be adjusted independently. As a result, the hardness of the seed layer (e.g., a composite seed layer) is a function of a deposition rate ratio between the rate of seed material deposition and the rate of FCA-C deposition.

In some embodiments, the substrate 102 can be a magnetic medium for a magnetic recording system rather than the sliders arranged in row bars. In several embodiments, the seed layer material can be TiN, TiC, $Si_3N_4$, $Ti_xSi_3N_4$, $Cr_xSi_yN_z$, where X, Y, and Z are non-zero positive integers, and/or other suitable seed layer materials. In a number of embodiments, the hardness of the seed layer resulting from the deposition of the seed layer material and the carbon material is proportional to an amount of the carbon material deposited, and more specifically, the amount of sp3 bonds deposited or injected. In one embodiment, an atomic percent of the carbon material is greater than an atomic percent of the seed layer material to ensure a preselected degree of seed layer hardness. In several embodiments, the co-deposition process is performed such that the seed layer has a preselected number of the sp3 carbon bonds.

In some embodiments, the first angle 104a for the seed layer material, measured with respect to the top surface of the substrate 102, is in a range from about 35 degrees to about 55 degrees. In another embodiment, the first angle 104a is in a range from about 40 degrees to about 50 degrees. In some embodiments, the second angle 106a for the carbon material, measured with respect to the top surface of the substrate, is in a range from about 75 degrees to about 105 degrees. In another embodiment, the second angle 106a is in a range from about 80 degrees to about 100 degrees. In the embodiment of FIG. 1, the seed material source 104 and the carbon material (FCA-C) source 106 are shown as having particular angles for the first angle 104a and the second angle 106a. In other embodiments, the first angle 104a and the second angle 106a can have other suitable values.

In a number of embodiments, the substrate is rotated at a preselected speed during the deposition of the seed layer material and the carbon material to achieve a preselected degree of deposition uniformity. In one such embodiment, the preselected speed is in a range of about 15 rpm to about 30 rpm.

In several embodiments, the seed material source 104 is a radio frequency (RF) magnetron, and the carbon material (FCA-C) source 106 is a filtered cathodic arc. In one such embodiment, the arc current of the FCA-C source 106 is about 20 to 100 amps, and the power level of the seed source 104 is set to about 100 to 350 watts. In other embodiments, the arc current and power levels can be set to other suitable values. In other embodiments, the seed material source 104 can be a ion beam sputter source and/or a chemical vapor deposition (CVD) source. In other embodiments, another vacuum deposition system configured with a carbon source and a seed source with suitable alignment capabilities can be used. In such case, the alternative vacuum deposition system can also include a pre-clean etch capability.

In some embodiments, the system further includes a sputter target for the seed layer material where a distance between the sputter target and the substrate is about 25 mm to about 65 mm. In one embodiment, the system includes a vacuum deposition chamber containing the substrate 102, where the vacuum deposition chamber has a preselected pressure in a range of about 0.25 mTorr to about 1.25 mTorr. In one embodiment, the seed material source 104 and the carbon material (FCA-C) source 106 are configured to deposit the seed layer material and the carbon material, respectively, simultaneously for a duration of about 5 seconds to about 25 seconds.

Figure 2:
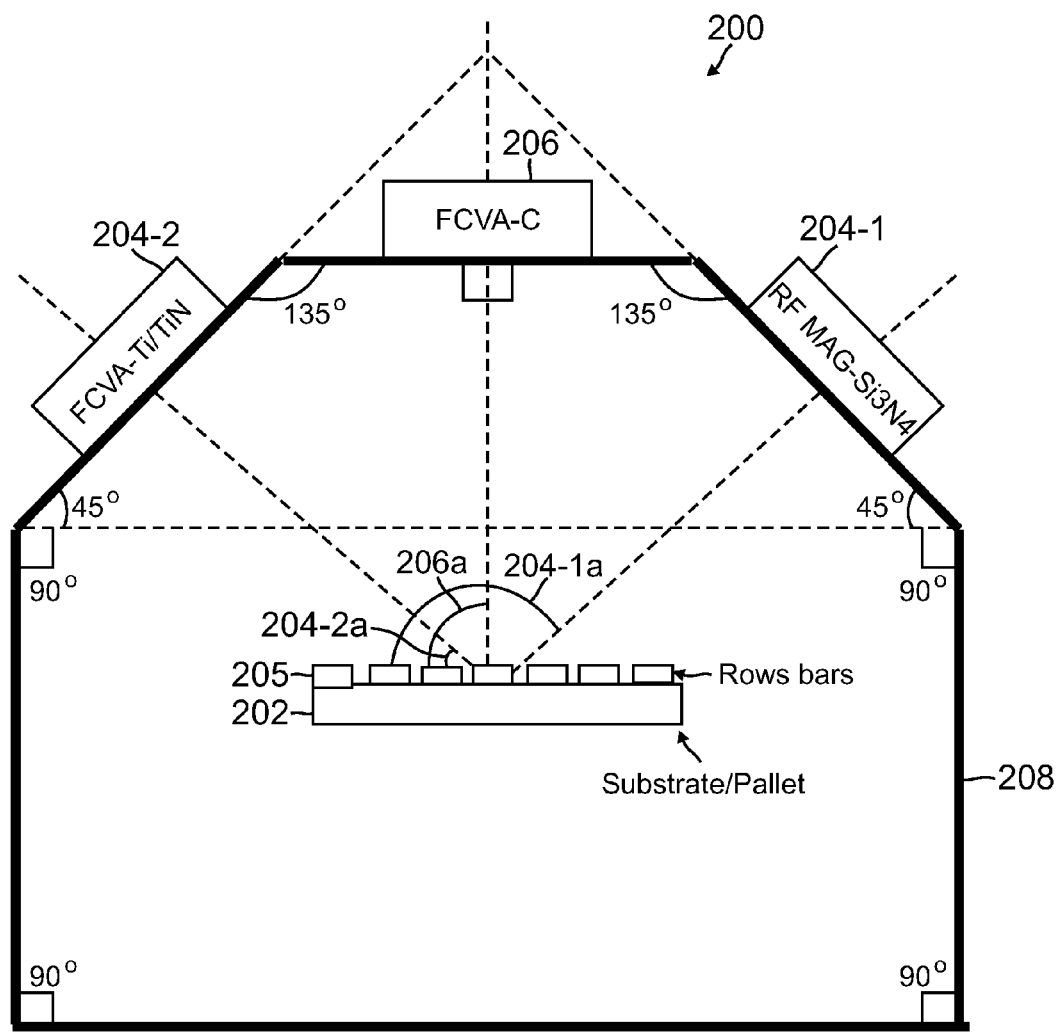
FIG. 2 is a schematic top view of a three source vacuum deposition system for tuning the seed layer hardness of sliders arranged in row bars on a rotatable substrate/pallet in accordance with one embodiment of the invention.

FIG. 2 is a schematic top view of a three source vacuum deposition system 200 for tuning the seed layer hardness of sliders arranged in row bars 205 on a rotatable substrate/pallet 202 in accordance with one embodiment of the invention. The three source vacuum deposition system 200 includes a filtered cathodic vacuum arc carbon material source ("FCVA-C") 206 configured to deposit or inject sp3 carbon bonds on a top surface (e.g., air bearing surface) of row bars 205 disposed on a substrate/pallet 202 at a second angle 206a measured with respect to a top surface of the row bars 205. The three source vacuum deposition system 200 further includes a first seed material source 204-1 (e.g., RF magnetron) configured to deposit a first seed material of $Si_3N_4$ on a top surface of the row bars 205 at a first angle 204-1a measured with respect to a top surface of the row bars 205. The three source vacuum deposition system 200 further includes a second seed material source (e.g., filtered cathodic vacuum arc or "FCVA-Ti/TiN")

204-2 configured to deposit a second seed material of Ti/TiN on the row bars 205 at a third angle 204-2a measured with respect to a top surface of the row bars 205.

In FIG. 2, the first angle 204-1a for the first seed material is about 135 degrees. The second angle 206a for the carbon material is about 90 degrees. The third angle 204-2a for the second seed material is about 45 degrees. In other embodiments, the first, second and third angles can have other suitable values. For example, in some embodiments, the first angle 204-1a is in a range from about 125 degrees to about 145 degrees. In some embodiments, the second angle 206a is in a range from about 75 degrees to about 105 degrees. In some embodiments, the third angle 204-2a is in a range from about 35 degrees to about 55 degrees.

The three source vacuum deposition system 200 also includes a vacuum chamber 208 that encloses or substantially encloses the substrate 202 and row bars 205 disposed thereon. The carbon material source ("FCVA-C") 206, the first seed material source 204-1, and the second seed material source ("FCVA-Ti/TiN") 204-2 are each mounted to an exterior surface of the vacuum chamber 208. In FIG. 2, a number of specific angles are shown for sides/walls of the vacuum chamber 208. In other embodiments, however, other suitable angles can be used.

In operation, the substrate/pallet 202 is configured to be rotated by a drive motor (not shown) to achieve optimal deposition uniformity. The carbon material source 206 and one or both of the first seed material source 204-1 and the second seed material source 204-2 are configured to be applied about simultaneously and for about the same duration. The deposition rates of the materials deposited by the seed sources (204-1, 204-2) and the carbon source 206 can be adjusted independently. As a result, the hardness of the seed layer is a function of a deposition rate ratio between the rate of seed material deposition(s) and the rate of carbon deposition.

In some embodiments, the substrate 202 can be replaced with a magnetic medium for a magnetic recording system rather than the sliders arranged in row bars. In several embodiments, the seed layer material(s) can be Ti, TiN, TiC, $Si_3N_4$, $Ti_XSi_3N_4$, $Cr_XSi_YN_Z$, where X, Y, and Z are non-zero positive integers, and/or other suitable seed layer materials. In a number of embodiments, the hardness of the seed layer resulting from the deposition of the seed layer material(s) and the carbon material is proportional to the amount of the carbon material deposited, and more specifically, the amount of sp3 bonds deposited or injected.

In a number of embodiments, the substrate is rotated at a preselected speed during the deposition of the seed layer material(s) and the carbon material to achieve a preselected degree of deposition uniformity. In one such embodiment, the preselected speed is in a range of about 15 rpm to about 30 rpm.

In several embodiments, the first seed material source 204-1 is a radio frequency (RF) magnetron, and the carbon material source 206 and the second seed material source 204-2 are FCA or FCVA deposition devices. In some embodiments, the system further includes a sputter target for the seed layer material(s) where a distance between the sputter target and the substrate is about 25 mm to about 65 mm. In one embodiment, the vacuum deposition chamber 208 has a preselected pressure in a range of about 0.25 mTorr to about 1.25 mTorr. In one embodiment, the seed material source(s) (204-1, 204-2) and the carbon material (FCVA-C) source 206 are configured to deposit the seed layer material(s) and the carbon material, respectively, simultaneously for a duration of about 5 seconds to about 25 seconds.

Figure 3:
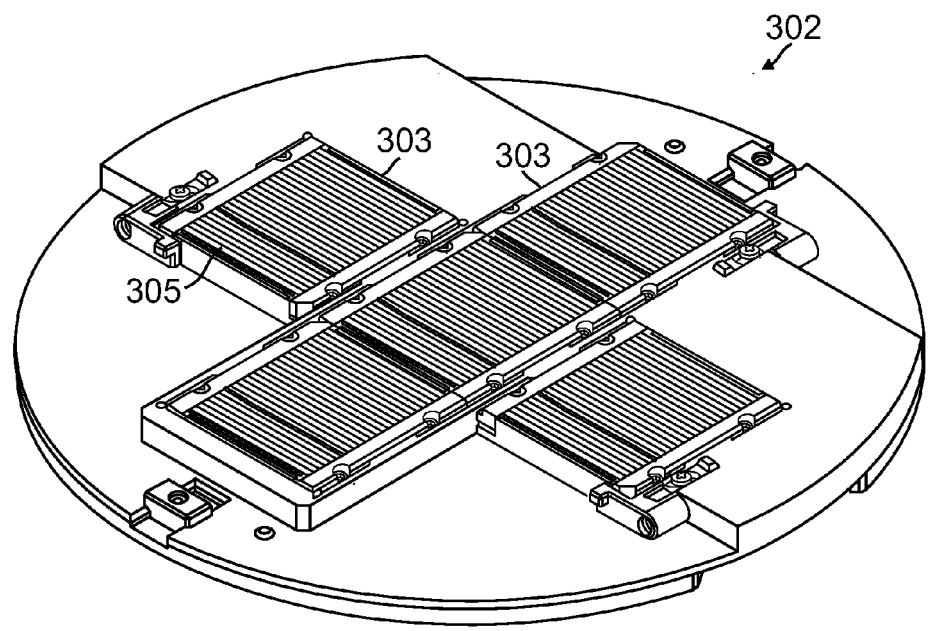
FIG. 3 is a perspective view of a rotatable substrate/pallet with multiple row bar carriers that can be used in the vacuum deposition systems of FIG. 1 or FIG. 2.

FIG. 3 is a perspective view of a rotatable substrate/pallet 302 with multiple row bar carriers 303 that can be used in the vacuum deposition systems of FIG. 1 or FIG. 2. More specifically, five row bar carriers 303 are mounted to the substrate/pallet 302. Each carrier 303 has a rectangular shape with a length of about 2.4 inches and a width of about 2 inches, though other suitable dimensions will work as well. Each carrier 303 includes a number of slots configured to receive the row bars 305. Each carrier 303 is configured to retain about 40 to 50 row bars 305, though other suitable numbers of row bars can be retained as well. In the embodiment illustrated in FIG. 3, the pallet 302 is configured to support and retain 5 carriers 303. In other embodiments, the pallet 302 can be configured to support and retain more than, or fewer than, 5 carriers 303.

Figure 4:
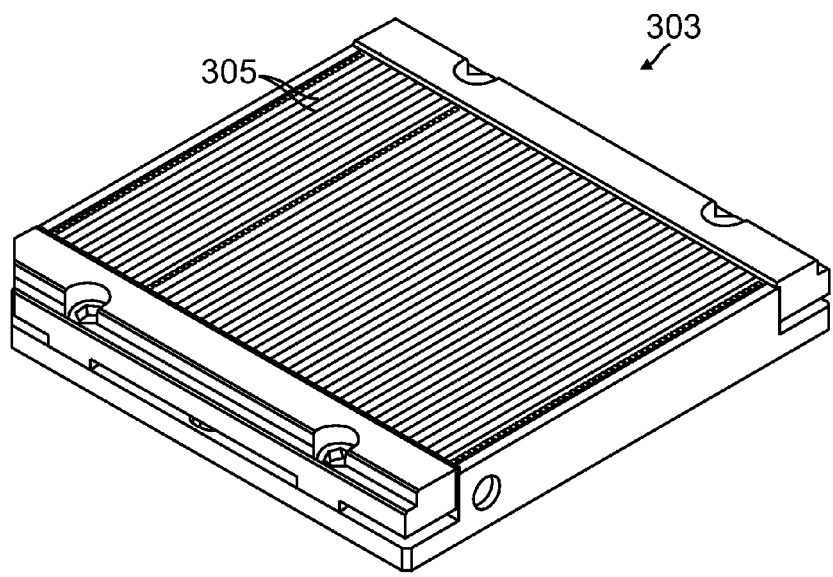
FIG. 4 is an expanded perspective view of a row bar carrier of the rotatable substrate/pallet of FIG. 3.

FIG. 4 is an expanded perspective view of the row bar carrier 303 of the rotatable substrate/pallet 302 of FIG. 3. As can be seen in FIG. 4, the carrier 303 contains a number of row bars 305 arranged such that a top exposed surface of the row bars corresponds to the air bearing surface (ABS) of the sliders disposed in the row bars. In several embodiments, about 50 to 60 sliders are disposed in a given row bar.

Figure 5:
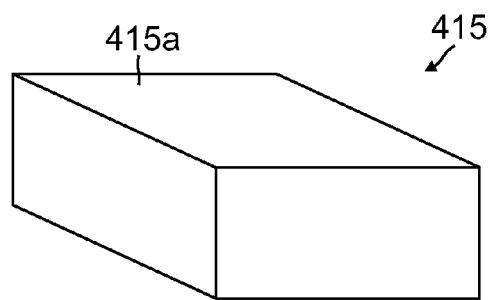
FIG. 5 is a schematic perspective view of a slider with a seed layer having been deposited along an air bearing surface thereof using a co-deposition system having both a seed layer material source and a carbon material source in accordance with one embodiment of the invention.

FIG. 5 is a schematic perspective view of a slider 415 with a seed layer 415a having been deposited along an air bearing surface thereof using a co-deposition system having both a seed layer material source and a carbon material source in accordance with one embodiment of the invention. The seed layer 415a can be deposited using one or both of the deposition systems described above for FIG. 1 and FIG. 2.

Figure 6:
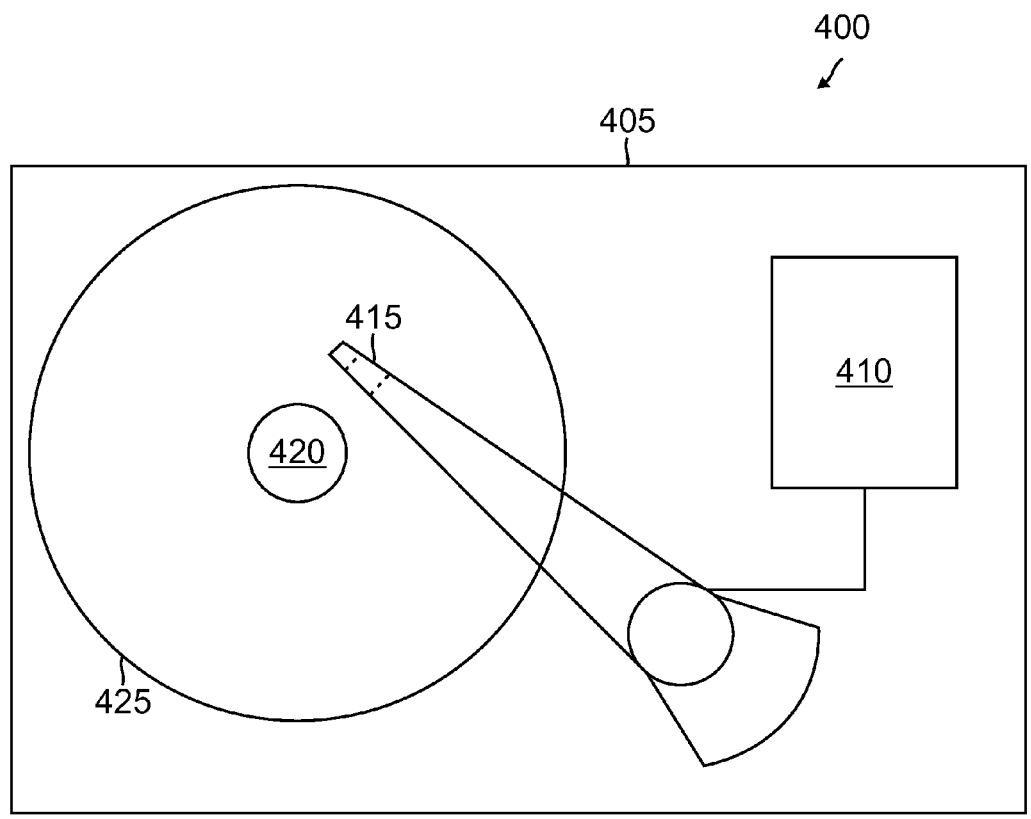
FIG. 6 is a top schematic view of a disk drive including the slider of FIG. 5 in accordance with one embodiment of the invention.

FIG. 6 is a top schematic view of a disk drive 400 including the slider 415 of FIG. 5 in accordance with one embodiment of the invention. Disk drive 400 may include one or more disks 425 to store data. Disk 425 resides on a spindle assembly 420 that is mounted to drive housing 405. Data may be stored along tracks in the magnetic recording layer of disk 425. The reading and writing of data is accomplished with head/slider 415 that has both read and write elements. The write element is used to alter the properties of the magnetic recording layer of disk 425. In one embodiment, head/slider 415 may have magneto-resistive (MR), or giant magneto-resistive (GMR) elements. In an alternative embodiment, head/slider 415 may be another type of head, for example, an inductive read/write head or a Hall effect head.

In operation, a spindle motor (not shown) rotates spindle assembly 420, and thereby rotates disk 425 to position head/slider 415 at a particular location along a desired disk track. The position of head/slider 415 relative to disk 425 may be controlled by position control circuitry 410. The use of head/slider 415 fabricated in the manners discussed above may improve the performance of magnetic recording in a disk drive configured for heat assisted magnetic recording (HAMR), energy assisted magnetic recording (EAMR), perpendicular magnetic recording (PMR) or microwave assisted magnetic recording (MAMR). More specifically, a harder seed layer should enhance wear and corrosion performance, therefore providing a potential to further reduce head over coat thickness for improved electro-magnetic gain of the read-write head.

Figure 7:
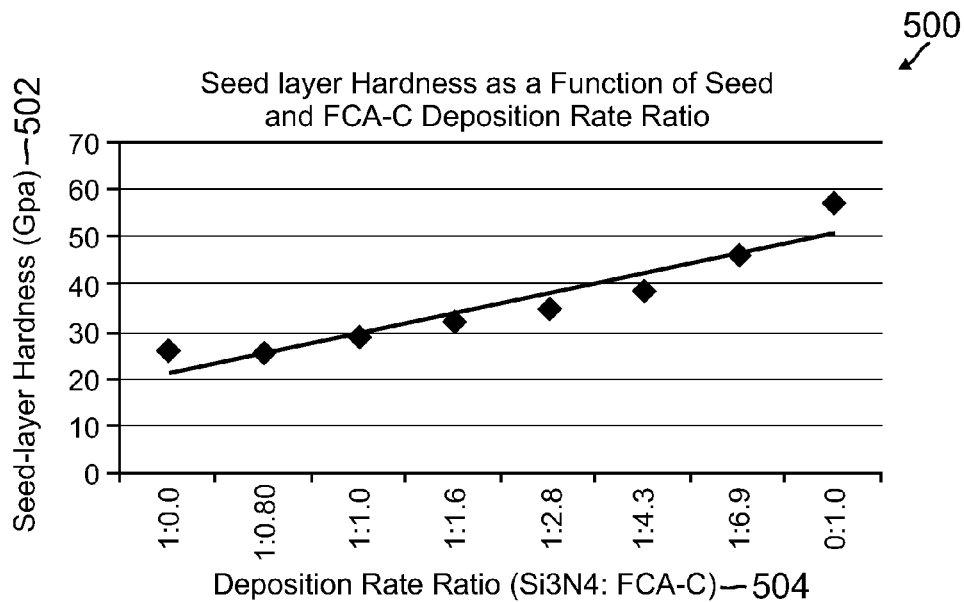
FIG. 7 is a graph of seed layer hardness versus a deposition rate ratio of the seed layer material deposition rate to the carbon material deposition rate in accordance with one embodiment of the invention.

FIG. 7 is a graph 500 of seed layer hardness 502 versus a deposition rate ratio 504 of the seed layer material deposition rate to the carbon material deposition rate in accordance with one embodiment of the invention. As can be seen in FIG. 7, when the deposition rate of carbon (FCA-C) is relatively low at 0.0, the seed layer hardness is relatively low (e.g., about 26 giga Pascal or GPa). However, when the deposition rate of carbon (FCA-C) is relatively high at 1.0, the seed layer hardness is relatively high (e.g., about 57 GPa or more than twice the hardness without the injected carbon). Thus, FIG. 7 shows that the seed layer hardness is dependent on the deposition rate ratio of the seed layer material to the carbon material. In addition, FIG. 7 shows that the seed layer hardness is proportional to the amount of carbon deposited.

Figure 8:
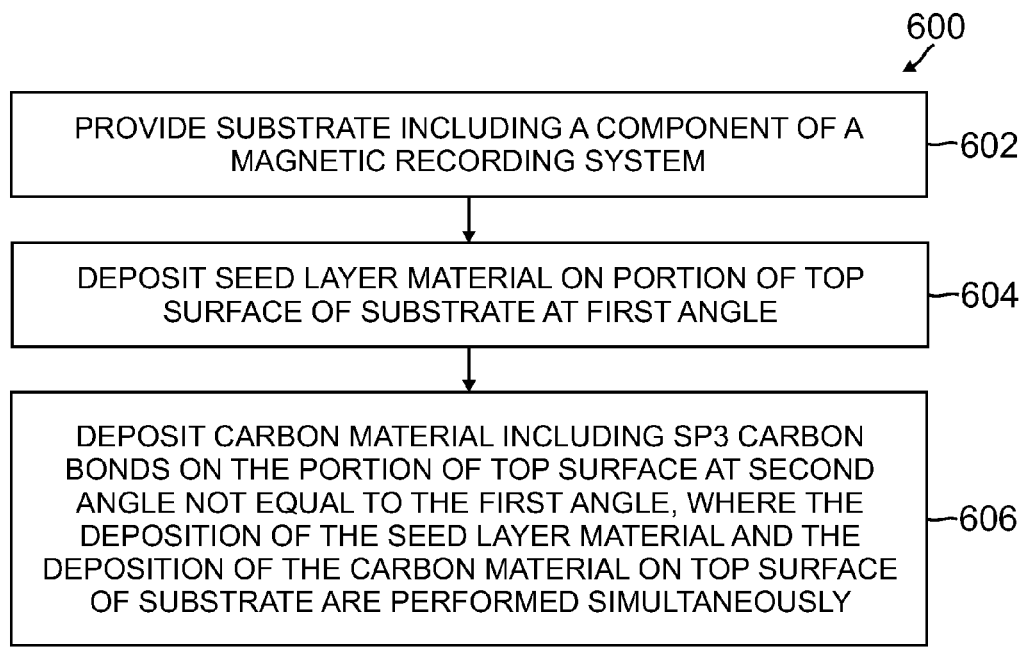
FIG. 8 is a flowchart of a co-deposition process for tuning seed layer hardness in components of a magnetic recording system such as a slider or a magnetic medium in accordance with one embodiment of the invention.

FIG. 8 is a flowchart of a co-deposition process 600 for tuning seed layer hardness in components of a magnetic recording system such as a slider or a magnetic medium in accordance with one embodiment of the invention. In particular embodiments, process 600 can be used in conjunction with the deposition systems of FIGS. 1 and/or 2 described above. The process first provides (602) a substrate that is a component of a magnetic recording system. The component can be a slider (e.g., disposed in a row bar) or a magnetic medium. The process then deposits (604) a seed layer material on a portion of a top surface of the substrate at a first angle. In some embodiments, a second seed layer material is deposited on the portion of the top surface at a third angle. The process also deposits (606) a carbon material including sp3 carbon bonds on the portion of the top surface at a second angle not equal to the first angle, where the depositing the seed layer material (604) and the depositing the carbon material (606) on the top surface of the substrate are performed simultaneously or about simultaneously.

In several embodiments, the process also includes rotating the substrate at a preselected speed during the depositing the seed layer material and the depositing the carbon material. In a number of embodiments, the process also includes forming magnetic transducers in the substrate, dicing the substrate into row bars, depositing the seed layer material on an ABS of the row bars at the first angle, depositing (e.g., during the seed layer material deposition) the carbon material including the sp3 carbon bonds on the ABS of the row bars at the second angle, and then dicing the row bars to form sliders.

In one embodiment, the process can perform the sequence of actions in a different order. In another embodiment, the process can skip one or more of the actions. In other embodiments, one or more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A method for tuning a seed layer hardness in components of a magnetic recording system, the method comprising:
   providing a substrate comprising a component of a magnetic recording system;
   depositing a seed layer material on a portion of a top surface of the substrate at a first angle; and
   depositing a carbon material comprising sp3 carbon bonds on the portion of the top surface at a second angle not equal to the first angle,
   wherein the depositing the seed layer material and the depositing the carbon material on the top surface of the substrate are performed simultaneously.

2. The method of claim 1, wherein the substrate is selected from the group consisting of a row bar comprising a plurality of sliders and a magnetic medium.

3. The method of claim 1, wherein the seed layer material comprises a material selected from the group consisting of TiN, TiC, $Si_3N_4$, $Ti_XSi_3N_4$, $Cr_XSi_YN_Z$, and combinations thereof, where X, Y, and Z are non-zero positive integers.

4. The method of claim 1, wherein a hardness of a seed layer resulting from the depositing the seed layer material and the depositing the carbon material on the portion of the top surface of the substrate is proportional to an amount of the carbon material deposited.

5. The method of claim 1:
   wherein the first angle for the seed layer material is measured with respect to the top surface and is in a range from about 35 degrees to about 55 degrees; and
   wherein the second angle for the carbon material is measured with respect to the top surface and is in a range from about 75 degrees to about 105 degrees.

6. The method of claim 1:
   wherein the depositing the seed layer material on the portion of the top surface of the substrate comprises depositing, using a radio frequency (RF) magnetron, the seed layer material on the top surface of the substrate; and
   wherein the depositing the carbon material on the portion of the top surface of the substrate comprises depositing, using a filtered cathodic arc, the carbon material on the top surface of the substrate.

7. The method of claim 1, further comprising rotating the substrate at a preselected speed during the depositing the seed layer material and the depositing the carbon material.

8. The method of claim 7, wherein the preselected speed is in a range of about 15 rpm to about 30 rpm.

9. The method of claim 1:
   wherein the depositing the seed layer material and the depositing the carbon material on the portion of the top surface of the substrate are performed simultaneously in a vacuum deposition chamber with a preselected substantially constant pressure in a range of about 0.25 mTorr to about 1.25 mTorr;
   wherein a duration of the depositing the seed layer material and the depositing the carbon material on the portion of the top surface of the substrate is in a range of about 5 seconds to about 25 seconds; and
   wherein a distance between a target for the seed layer material and the substrate is about 25 mm to about 65 mm.

10. The method of claim 1:
    forming a plurality of magnetic transducers in the substrate;
    dicing the substrate into row bars;
    depositing the seed layer material on an air bearing surface (ABS) of the row bars at the first angle;
    depositing the carbon material comprising sp3 carbon bonds on the ABS of the row bars at the second angle; and
    dicing the row bars to form a plurality of sliders.

11. The method of claim 1, wherein an atomic percent of the carbon material is greater than an atomic percent of the seed layer material.

12. A system for tuning a seed layer hardness in components of a magnetic recording system, the system comprising:
    a substrate comprising a component of a magnetic recording system;
    a first deposition source configured to deposit a seed layer material on a portion of a top surface of the substrate at a first angle; and
    a second deposition source configured to deposit a carbon material comprising sp3 carbon bonds on the portion of the top surface at a second angle not equal to the first angle,
    wherein the first deposition source and the second deposition source deposit the seed layer material and the carbon material, respectively, simultaneously.

13. The system of claim 12, wherein the substrate is selected from the group consisting of a row bar comprising a plurality of sliders and a magnetic medium.

14. The system of claim 12, wherein the seed layer material comprises a material selected from the group consisting of TiN, TiC, $Si_3N_4$, $Ti_XSi_3N_4$, $Cr_XSi_YN_Z$, and combinations thereof, where X, Y, and Z are non-zero positive integers.

15. The system of claim 12, wherein a hardness of a seed layer resulting from a deposition of the seed layer material and the carbon material is proportional to an amount of the carbon material deposited.

16. The system of claim 12:
wherein the first angle for the seed layer material is measured with respect to the top surface and is in a range from about 35 degrees to about 55 degrees; and
wherein the second angle for the carbon material is measured with respect to the top surface and is in a range from about 75 degrees to about 105 degrees.

17. The system of claim 12:
wherein the first deposition source comprises a radio frequency (RF) magnetron; and
wherein the second deposition source comprises a filtered cathodic arc.

18. The system of claim 17, further comprising a sputter target for the seed layer material wherein a distance between the sputter target and the substrate is about 25 mm to about 65 mm.

19. The system of claim 12, wherein the substrate is rotated at a preselected speed during a deposition of the seed layer material and a deposition of the carbon material.

20. The system of claim 19, wherein the preselected speed is in a range of about 15 rpm to about 30 rpm.

21. The system of claim 12, further comprising:
a vacuum deposition chamber containing the substrate, wherein the vacuum deposition chamber has a preselected pressure in a range of about 0.25 mTorr to about 1.25 mTorr;
wherein the first deposition source and the second deposition source are configured to deposit the seed layer material and the carbon material, respectively, simultaneously for a duration of about 5 seconds to about 25 seconds; and
wherein a distance between a target for the seed layer material and the substrate is about 25 mm to about 65 mm.

22. The system of claim 12, wherein an atomic percent of the carbon material is greater than an atomic percent of the seed layer material.

23. The system of claim 12, further comprising:
a third deposition source configured to deposit a second seed layer material on the portion of the top surface of the substrate at a third angle not equal to the first angle or to the second angle.

* * * * *